July 6, 1943. R. E. ACKER 2,323,508
VALVE GAUGE
Filed Nov. 28, 1941
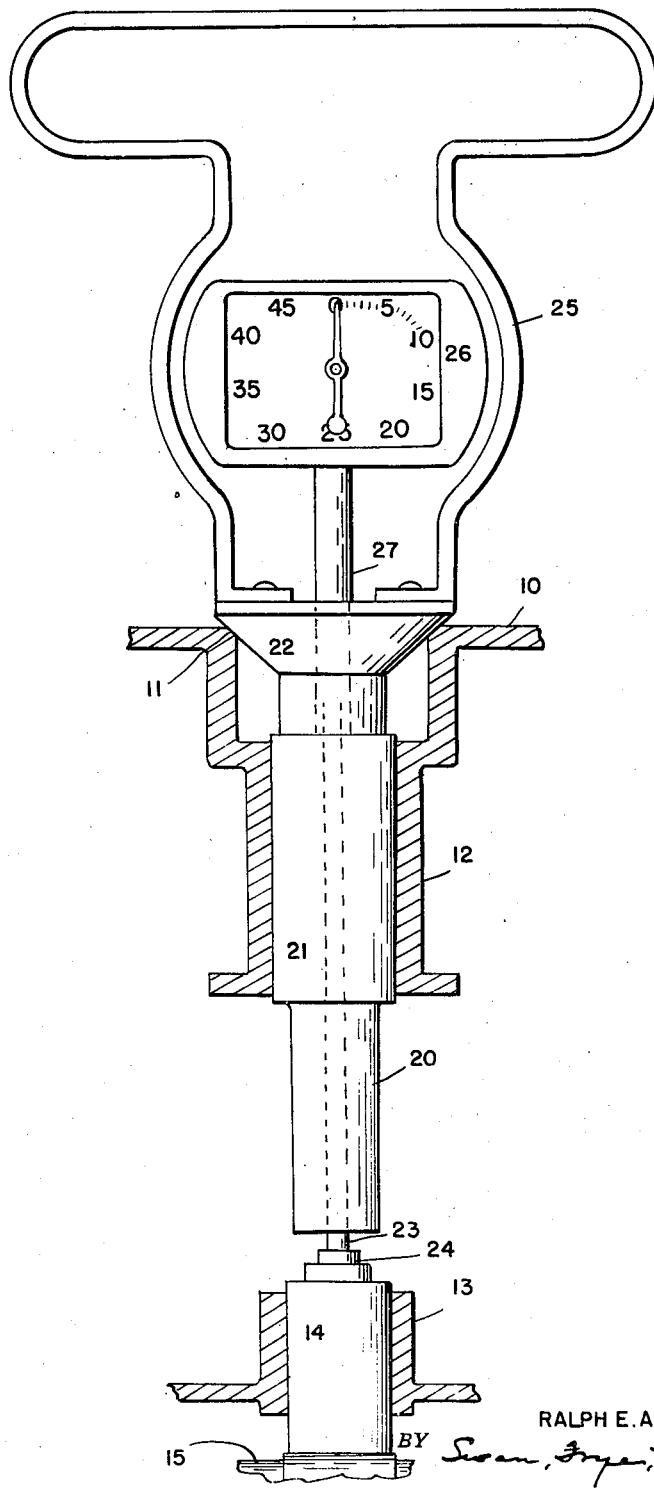
INVENTOR.
RALPH E. ACKER
BY
ATTORNEYS Patented July 6, 1943

2,323,508

UNITED STATES PATENT OFFICE 2,323,508

VALVE GAUGE

Ralph E. Acker, Detroit, Mich.

Application November 28, 1941, Serial No. 420,803

2 Claims. (Cl. 33—181)

The present invention relates to special tools or gauges for use in determining the proper length of valve and stem for use in motors—specifically motors undergoing reconditioning or rebuilding.

Among the objects of the invention is a tool which, with minor changes, may be used to determine the proper length of valve and stem to be used at a given valve port to provide the correct clearance when installed.

Another object is a tool of the kind indicated which is provided with a direct reading gauge which indicates without further calculation the correct length of valve and stem.

Other objects will readily occur to those skilled in the art upon reference to the following description and drawing in which the single figure is an elevational view of the tool, shown in conjunction with parts of an engine or motor to indicate the method of use.

In the drawing, there is shown at 10 that part of an engine in which is formed the valve seat 11 and which receives the valve guide (not shown), the latter being inserted in the restricted portion marked 12.

The drawing also shows at 13 that portion of the engine structure which serves to maintain and guide the valve push rod 14 which, coacting with the camshaft 15, serves to move the valve (not shown) in its cooperation with seat 11.

In the operation of rebuilding or reconditioning an engine, it is necessary, or at least desirable, to reface the valve seats and replace the valves themselves, and since such refacing and replacement requires accurately fitting the valves some means must be used to determine the distance between the sloping valve seat 11 and the top surface of rod 14. After such measurement is taken, the new valve must be given that length which when inserted, will have a suitable clearance when the valve is seated.

With the present tool, the direct reading gauge indicates how much must be removed from the standard length new valve and stem to fit properly in that particular seat.

As shown in the drawing, the tool or gauge consists of a shaft or stem portion 20 having a cylindrical enlarged part 21 of such diameter as to slide easily into the valve guide opening 12 and having at its upper end a conical head 22, the angle of which is the same as the angle of the face of the valve seat 11.

This shaft and head is somewhat shorter than a valve and stem, and is provided with an axial bore to receive a rod 23 slidable in the bore and terminating at its lower end in a suitable boot 24.

Mounted upon the upper face of head 22 is a suitable handle 25 and also a direct reading gauge 26, the actuating stem of which is enclosed within a suitable tube 27 in head 22 and connected by suitable means to the rod 23.

It is preferred to so adjust the several parts that when the cam 15 is in such position that a valve would be seated, the gauge would register at zero if the valve seat and rod 14 were in their original exact condition.

With such an adjustment, the use of the tool indicates the amount this condition has been changed due to any wear on rod 14 and to refacing or reconditioning of the valve seat 11.

It is to be understood that the invention may be embodied in other specific forms without departing from the spirit or essential attributes thereof, and it is desired that the present embodiment be considered in all respects as illustrative and not restrictive; reference being had to the appended claims rather than to the foregoing description to indicate the scope of the invention.

I claim:

1. A valve length indicator consisting of a stem provided with an enlarged cylindrical portion intermediate its ends and a conical head the angle of which is the same as the angle of a valve seat to be tested, said stem and head being provided with an axial bore; a rod slidably mounted in said bore and provided with a push-rod contacting foot, an indicator mounted upon said head and actuable by said rod and protective means fixed to said head and embracing said indicator.

2. For use in measuring the required length of valve and stem to fit a valve seat and pushrod length, a tool consisting of a stem of a length less than the length of a valve and valve-stem, said stem having guide means thereon whereby to center and maintain alignment of said stem, said stem being also provided with a simulated valve head adapted to rest upon a valve seat, movable means at the end of said stem for contacting the pushrod and be moved thereby and means for indicating the amount of movement when said simulated valve head is moved into seated position upon the valve seat.

RALPH E. ACKER.